US012617625B2

(12) United States Patent
Baker et al.

(10) Patent No.: US 12,617,625 B2
(45) Date of Patent: May 5, 2026

(54) APPARATUS AND METHOD FOR ACTIVATING CONVEYOR BELT ROLLERS

(71) Applicant: Laitram, L.L.C., Harahan, LA (US)

(72) Inventors: Andrew N. Baker, New Orleans, LA (US); Yorrick Mulder, Baltimore, MD (US); Paul Edward Kirkpatrick, Jr., Woodbine, MD (US); Jeffrey S. Schwai, Walkersville, MD (US)

(73) Assignee: Laitram, L.L.C., Harahan, LA (US)

( * ) Notice: Subject to any disclaimer, the term of this patent is extended or adjusted under 35 U.S.C. 154(b) by 213 days.

(21) Appl. No.: 18/557,138

(22) PCT Filed: Apr. 12, 2022

(86) PCT No.: PCT/US2022/024359
§ 371 (c)(1),
(2) Date: Oct. 25, 2023

(87) PCT Pub. No.: WO2022/240534
PCT Pub. Date: Nov. 17, 2022

(65) Prior Publication Data
US 2024/0199339 A1      Jun. 20, 2024

Related U.S. Application Data

(60) Provisional application No. 63/186,976, filed on May 11, 2021.

(51) Int. Cl.
*B65G 17/24*        (2006.01)
*B65G 47/52*        (2006.01)
(52) U.S. Cl.
CPC .............. *B65G 17/24* (2013.01); *B65G 47/52* (2013.01)

(58) Field of Classification Search
CPC ................................ B65G 17/24; B65G 47/52
(Continued)

(56) References Cited

U.S. PATENT DOCUMENTS 6,439,375 B1      8/2002  Foster et al.
6,571,937 B1 *    6/2003  Costanzo ............... B65G 13/10
                                                                  198/779

(Continued)

FOREIGN PATENT DOCUMENTS

CN        110026344 A      7/2019
CN        211191419 U      8/2020
KR        100857833 B1     9/2008

OTHER PUBLICATIONS

Extended European Search Report of European patent application No. 22808005.7, mailed Jun. 6, 2025, European Patent Office, Munich, Germany.
(Continued)

*Primary Examiner* — Mark A Deuble
(74) *Attorney, Agent, or Firm* — Catherine M. Bishop

(57) ABSTRACT

Apparatus and method for activating conveyor belt roller assemblies by lowering and extending wearstrips to selectively lower the conveyor belt to place the conveyor belt roller assemblies into contact with actuating rollers. A wearstrip module housing the wearstrips includes an upper support upon which the wearstrips are mounted that is longitudinally and vertically movable relative to a lower support fixed relative to the actuating rollers. Mounting brackets rotatably mount the lower support and actuating rollers in a fixed position and orientation.

18 Claims, 9 Drawing Sheets

(58) Field of Classification Search
USPC .......................................................... 198/779
See application file for complete search history.

(56) References Cited

U.S. PATENT DOCUMENTS

| 7,284,653 | B2 | 10/2007 | Fourney et al. | |
| 7,306,086 | B2 | 12/2007 | Boelaars | |
| 7,533,766 | B1 | 5/2009 | Fourney | |
| 7,607,533 | B2 * | 10/2009 | Pressler ................. | B65G 17/24 |
| | | | | 198/779 |
| 7,731,010 | B2 * | 6/2010 | Kissee ................... | B65G 47/22 |
| | | | | 198/370.09 |
| 7,942,257 | B2 * | 5/2011 | DePaso ................. | B65G 21/20 |
| | | | | 198/833 |
| 8,167,118 | B2 * | 5/2012 | Fourney ................ | B65G 17/24 |
| | | | | 198/779 |
| 8,172,069 | B2 * | 5/2012 | Prakasam .............. | B65G 17/24 |
| | | | | 198/779 |
| 8,424,675 | B2 * | 4/2013 | Rau ........................ | B65G 17/24 |
| | | | | 198/779 |
| 8,622,202 | B2 * | 1/2014 | Rau ........................ | B65G 17/24 |
| | | | | 198/779 |
| 9,108,801 | B2 * | 8/2015 | Constanzo ............. | B65G 47/53 |
| 9,352,908 | B1 * | 5/2016 | Fourney ................. | B65G 39/20 |
| 2006/0249355 | A1 | 11/2006 | Costanzo | |
| 2008/0121495 | A1 * | 5/2008 | Pressler ............. | B65G 21/2054 |
| | | | | 198/411 |
| 2008/0251359 | A1 | 10/2008 | Fourney | |
| 2011/0056807 | A1 | 3/2011 | Fourney | |
| 2011/0303512 | A1 | 12/2011 | Rau | |
| 2017/0043959 | A1 | 2/2017 | DePaso et al. | |

OTHER PUBLICATIONS

Office Action of Chinese Patent Application No. 202280030777.5 dated Dec. 26, 2025—China National Intellectual Property Administration.

* cited by examiner

APPARATUS AND METHOD FOR ACTIVATING CONVEYOR BELT ROLLERS

RELATED APPLICATIONS

The present invention claims priority to U.S. Provisional Patent Application No. 63/186,976 entitled "Apparatus and Method for Activating Conveyor Belt Rollers" filed May 11, 2021, the contents of which are herein incorporated by reference.

BACKGROUND

The invention relates generally to power-driven conveyors and, more particularly, to conveyors having conveyor belts with article-supporting roller assemblies extending through the thickness of the belt. The article-supporting rollers are selectively activated by lowering and extending belt-supporting wearstrips to place lower conveyor belt rollers in contact with activating rollers in an activation assembly. The article-supporting roller assemblies are selectively deactivated by raising and retracting the wearstrips to bring them into contact with and raise the conveyor belt body away from the activating rollers.

Modular plastic conveyor belts with article-supporting rollers extending through the belt are used in many package-handling conveyors, such as sorters, singulators, and diverters. The belt rollers are activated by bearing surfaces, such as flat wearstrips or roller arrays, underlying the belt on the carryway. As the belt advances along the carryway, the belt rollers rotate as they roll on the bearing surfaces. Articles atop the rollers are pushed along the advancing belt in a direction perpendicular to the rollers' axes of rotation, which may be parallel, perpendicular, or oblique to the direction of belt travel.

In some applications, it is desirable to selectively activate and deactivate the belt rollers. This is conventionally done by moving, such as raising and lowering, the bearing surfaces into and out of contact with the belt rollers. But the bearing surfaces that have to be moved can be heavy or unwieldy and require a heavy motor or complex framework to make them move.

SUMMARY

These shortcomings are overcome by a conveyor embodying features of the invention. In one version, the conveyor comprises a conveyor belt advancing longitudinally in a direction of belt travel. The conveyor has article-supporting roller assemblies arranged in longitudinal columns and lateral rows. The roller assemblies include a top roller for contacting an article being conveyed and a bottom roller extending from the bottom of the conveyor belt for activating the top roller to selectively divert articles off the conveyor belt. The conveyor includes an activation assembly comprising freely-spinning actuating rollers that are fixed in position for selectively activating the bottom rollers and raisable and retractable wearstrips for pulling the conveyor belt away from the actuating rollers to deactivate the roller assemblies.

According to one aspect, a conveyor comprises a conveyor belt advancing longitudinally in a direction of belt travel and having a plurality of article-supporting roller assemblies arranged in longitudinal columns and lateral rows, each roller assembly comprising an upper roller protruding above a top surface of the conveyor belt and a bottom roller for actuating the upper roller protruding below a bottom surface of the conveyor belt, longitudinally-extending wearstrips laterally offset from the columns of article-supporting roller assemblies and extending in the direction of belt travel below the conveyor belt, longitudinally-extending actuating rollers disposed at a fixed level below the conveyor belt and between the wearstrips and aligned with the columns of roller assemblies and means for moving the wearstrips vertically and longitudinally into and out of supporting contact with the conveyor belt to selectively raise the conveyor belt out of contact with the actuating rollers.

According to another aspect, a wearstrip module for selectively raising and retracting a set of wearstrips comprises a lower frame comprising a pair of lower side walls connected by a top wall, the lower side walls including ramps at upper edges, an actuator housed between the lower side walls, an upper frame comprising a pair of upper side walls connected by a bottom wall, the upper side walls including downwardly angled edges that protrude below the bottom wall, the upper frame connected to the actuator, longitudinally extending wearstrips coupled to top edges of the upper side walls, a first set of low-friction inserts coupled to the ramps and a second set of low-friction inserts coupled to the downwardly angled edges. The second set of low-friction inserts rest on the first set of low-friction inserts, so that longitudinal movement of the upper frame relative to the lower frame effects vertical movement of the upper frame relative to the lower frame.

According to another aspect, a method for operating an advancing conveyor belt having rows and columns of article-supporting roller assemblies extending through the thickness of the belt is provided. The method comprises the steps of deactivating the article-supporting roller assemblies by raising and retracting wearstrips into contact with portions of the conveyor belt between the columns of article-supporting roller assemblies to pull and raise the conveyor belt out of contact with actuating rollers mounted between mounting brackets and activating the article-supporting roller assemblies by lowering and extending the wearstrips relative to the mounting brackets, so that the article supporting roller assemblies contact the actuating rollers.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
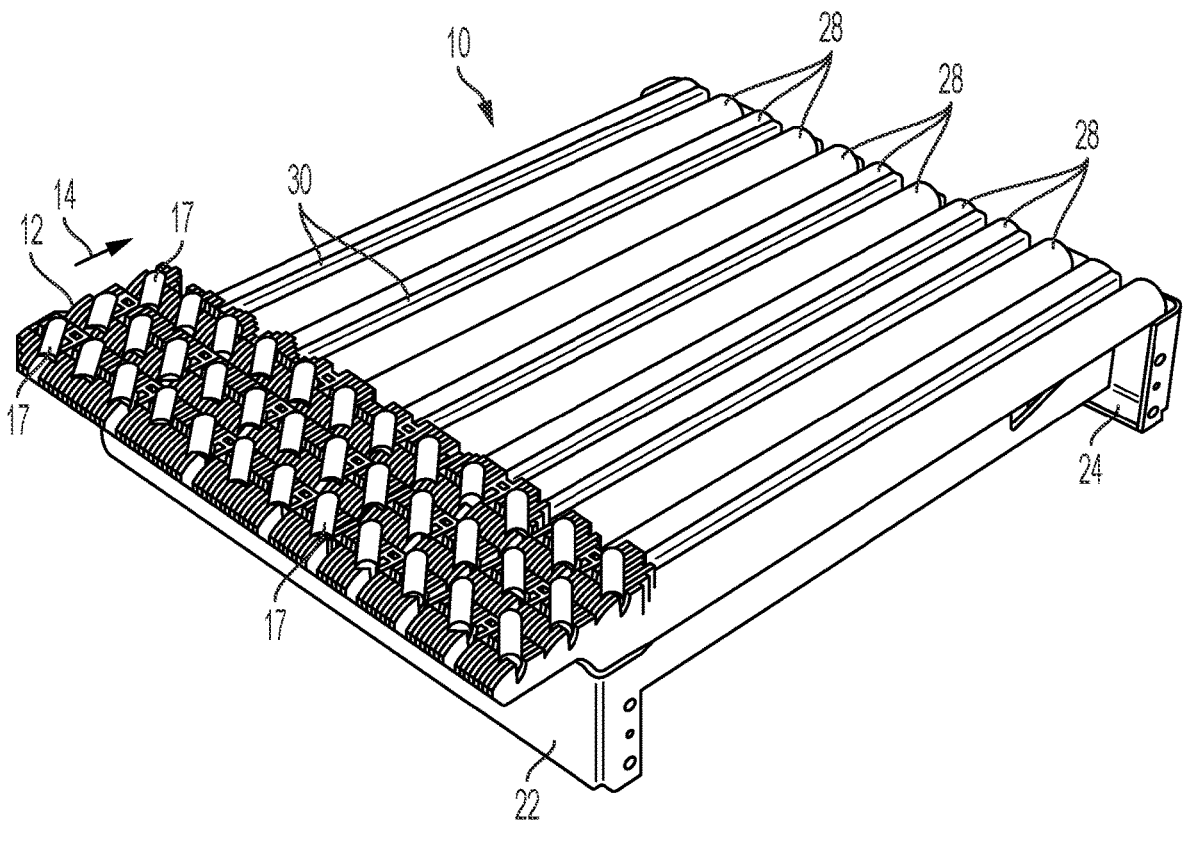
FIG. 1 is an isometric view of an activation assembly for a conveyor belt, a portion of which is shown.
Figure 2:
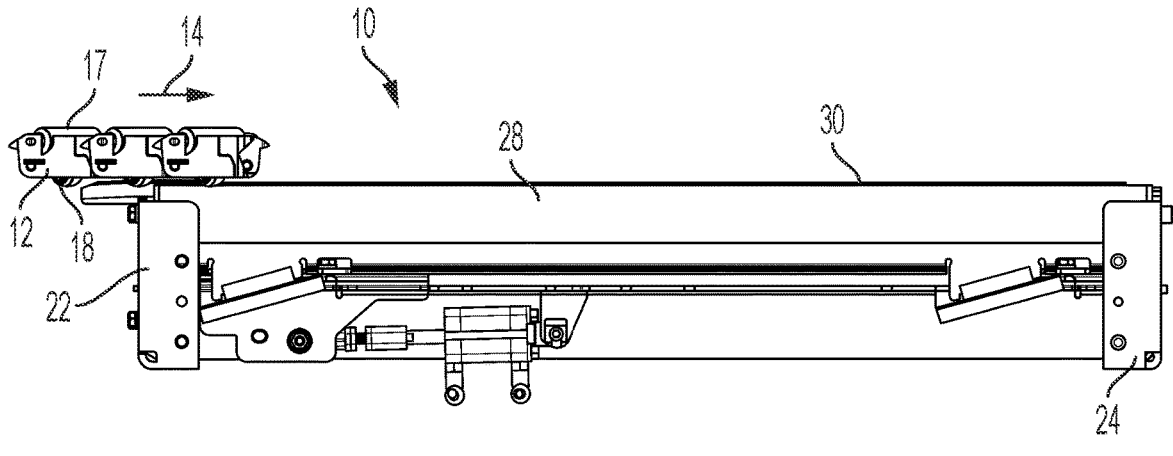
FIG. 2 is a side view of the activation assembly and conveyor belt portion of FIG. 1.

A portion of a conveyor embodying features of the invention is shown in FIGS. 1-2. The portion comprises an activation assembly 10 in a divert region that is attached to a conveyor frame (not shown) to selectively divert articles transported by a conveyor belt 12. The conveyor 10 transports articles atop a conveyor belt 12 along an upper carryway run in a direction of belt travel 14. The illustrative conveyor belt 12 is an Intralox® DARB™ S4500 modular plastic conveyor belt comprising hingedly connected modules forming an endless loop. The belt shown contains article-supporting roller assemblies arranged in lateral rows and longitudinal columns. Each roller assembly includes a top roller 17 protruding above the top surface of the conveyor belt modules and a bottom roller 18 protruding past the bottom surface of the conveyor belt modules and in frictional contact with, or otherwise cooperating with, the top roller 17. When the bottom roller 18 rotates, it induces a counter rotation in the top roller 17, as known in the art. Both illustrative rollers 17, 18 rotate on axes oblique to the longitudinal direction of the belt given by its direction of travel 14, but the invention is not so limited. The activation assembly 10 forms bearing surfaces for selectively contacting and inducing rotation in the bottom rollers 18, to cause the top rollers 17 to counterrotate and divert products from the belt 12. Either or both of the top and bottom rollers 17, 18 could have an outer high-friction tread or coating for better frictional contact.

The activation assembly 10 supports the carryway of the conveyor belt 12 in the illustrated portion. The activation assembly includes a series of actuating rollers 28 spanning the width of the conveyor, each actuating roller 28 extending longitudinally in the direction of belt travel 14 from a first end to a second end of the activation assembly 10. The actuating rollers 28 are rotatably mounted between mounting brackets 22, 24 at each end of the assembly 10, fixed in orientation and position. Each actuating roller 28 lies below a line of conveyor belt roller assemblies comprising top and bottom rollers 17, 18. The activation assembly 10 further includes a series of selectively raisable and retractable wearstrips 30 for selectively supporting the conveyor belt in an inactive position, out of contact with the actuating rollers. The wearstrips 30 are laterally offset from the columns of article-supporting roller assemblies in the conveyor belt 12.

Based on the position of the wearstrips 30, in the activation assembly region 10, the conveyor belt 12 is supported either on the peripheries of the actuating rollers 28 or on the wearstrips 30. When the wearstrips 30 are extended forward past the front mounting bracket 22 and lowered beneath the actuating rollers 28, the conveyor belt is supported on the actuating rollers 28, as shown in FIG. 2. In this activated position, the salient portions of the lower rollers 18 extending past the bottom surface of the belt contact the peripheries of the actuating rollers 28. The forward motion of the belt in the direction of belt travel 14 causes the lower belt rollers 18 and the actuating rollers 28 to rotate against each other, which in turn causes the upper belt rollers 17 to rotate against the lower belt rollers 18, causing a product supported by the upper belt rollers 17 to divert from the conveyor belt.

When the wearstrips 30 are retracted in the longitudinal direction and raised above the actuating rollers 28, the belt 12 rides on the wearstrips 30, out of contact with the actuating rollers 28, as described below.

The wearstrips 30 are housed in a series of wearstrip modules, which are configured to selectively move the wearstrips 30 in vertical and longitudinal directions. In the illustrative embodiment, a series of three wearstrip modules span the width of the activation assembly 10, each wearstrip module comprising two wearstrips 30 on an upper support that is movably mounted to a static lower support.

Figure 3:
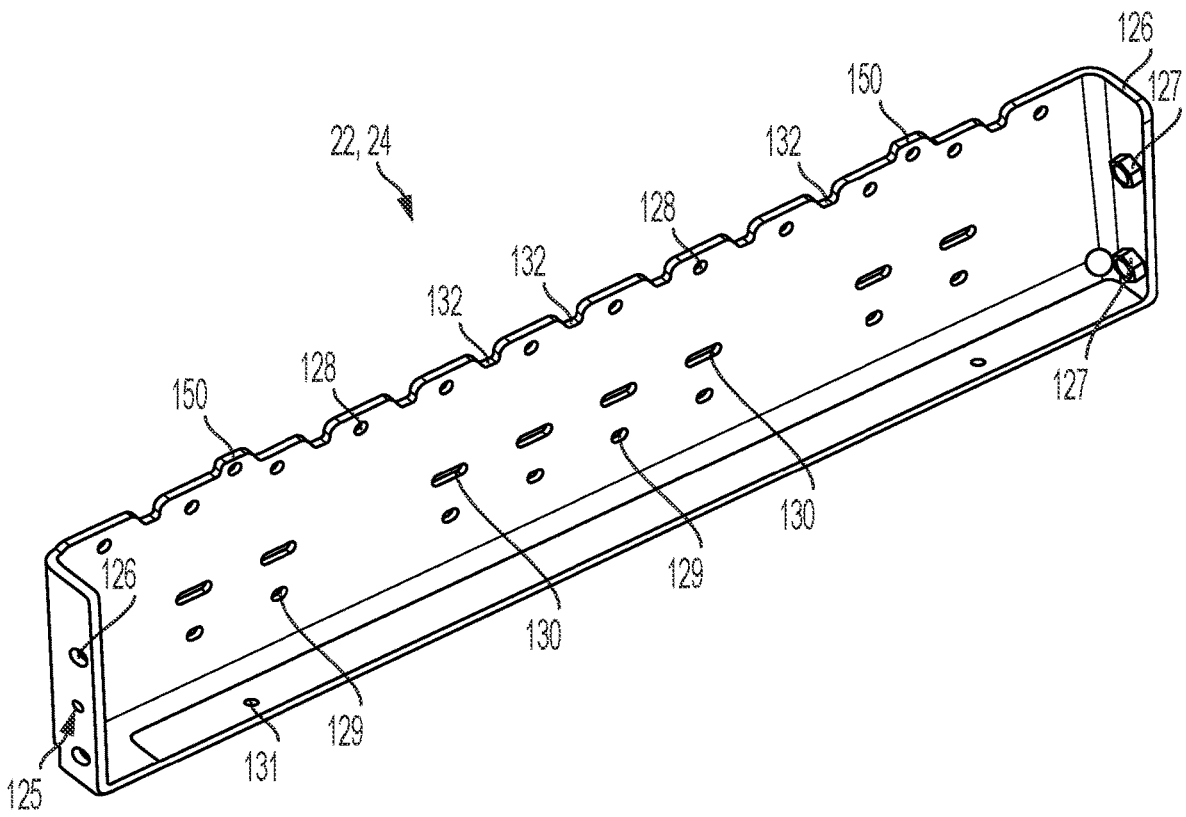
FIG. 3 is an isometric view of a mounting bracket for the activation assembly of FIG. 1.

Referring to FIG. 3, each mounting bracket 22, 24 comprises a plate spanning the width of the activation assembly 10, which may span the width of the conveyor. The plate includes roller openings 128 for rotatably mounting the actuating rollers 28 and wearstrip support openings, shown as slots 130, below the roller openings 128 for mounting a wearstrip support as described below. Below the wearstrip support openings, the mounting bracket further includes wearstrip support fastener openings 129 for fastening the wearstrip support to the mounting bracket 22 or 24. Recesses 132 in an upper edge providing clearance for the wearstrips 30.

The mounting brackets 22, 24 further include mounting tabs 126 extending inwards, perpendicular to the plate and including mounting openings 127 for mounting the assembly 10 to a conveyor frame. A pin hole 125 between the mounting openings 127 can be used to align and locate the activation assembly 10 in a conveyor frame prior to inserting fasteners through the mounting openings 127.

A tie down hole may be included in a bottom wall 131 extending between the mounting tabs 126 and bottom edge of the plate for tying off air lines or other cabling inside the conveyor, if necessary. The bottom wall 131 also facilitates location of the activation assembly 10 within a conveyor frame.

Lifting points 150 provide an attachment location for lifting straps or rigging to facilitate insertion and removal of the activation assembly 10 within or from a conveyor frame.

Each activation assembly 10 includes a series of wearstrips modules, each containing two raisable and retractable wearstrips 30 extending longitudinally in the direction of belt travel. The wearstrips 30 are located between pairs of actuating rollers 28 and are laterally offset from the columns of article-supporting roller assemblies, as described below.

Figure 4:
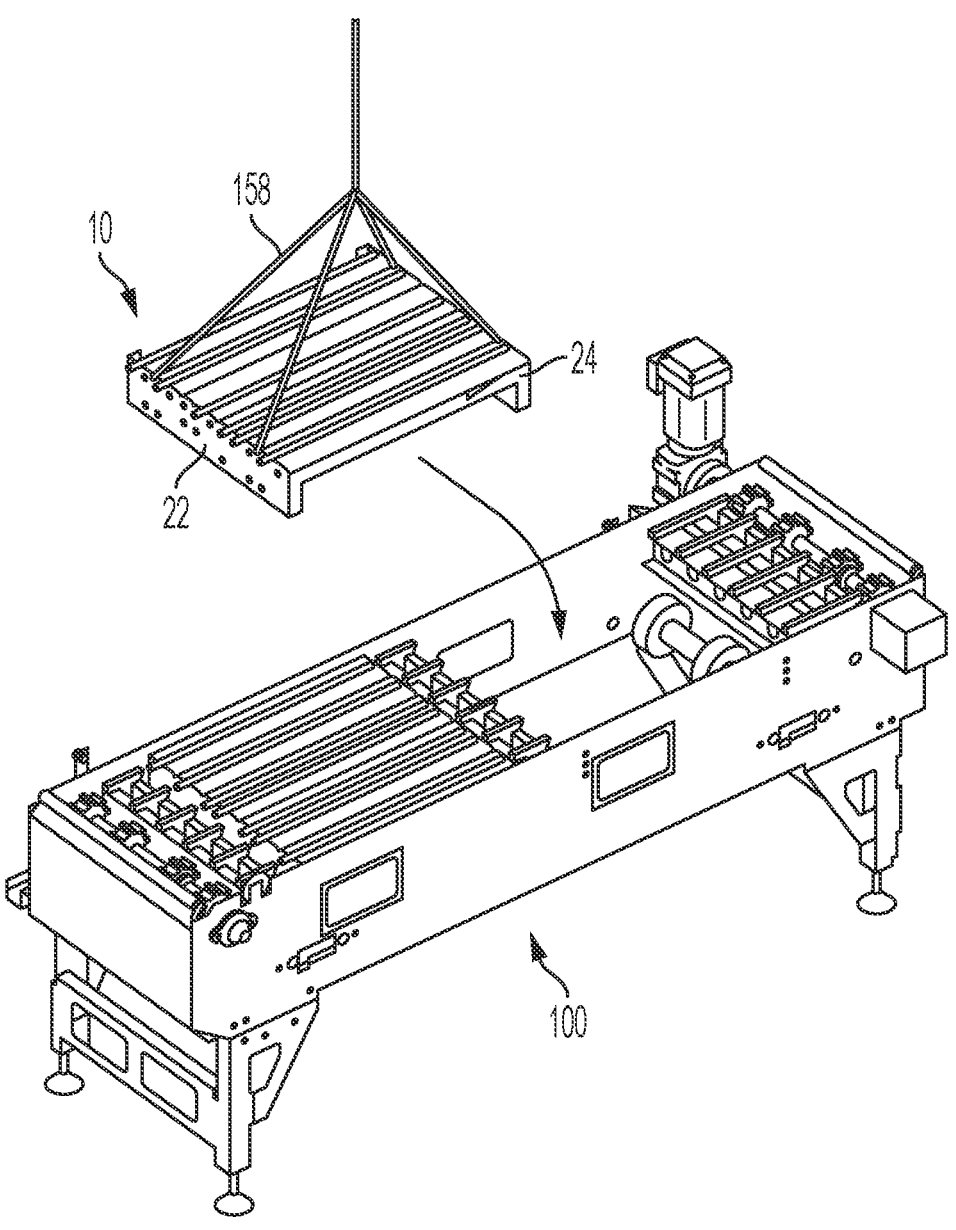
FIG. 4 shows the activation assembly of FIG. 1 during insertion into a conveyor frame.

As shown in FIG. 4, each activation assembly 10 can be preassembled and lowered into a conveyor frame 100, with one or more activation assemblies 10 used in each conveyor frame 100 to form a configurable activation region. The illustrative lifting points 150 in the brackets 22, 24 are used to facilitate insertion of the activation assembly using lifting straps 158, but other suitable means for inserting an activation assembly 10 may be used. After the assembly is lowered into the proper position within the frame 100, pins may be inserted into the pin holes 125 to lock the assemblies in place, then fasteners inserted through fastener openings 127 attach the activation assembly 10 to the conveyor frame 100.

Figure 5:
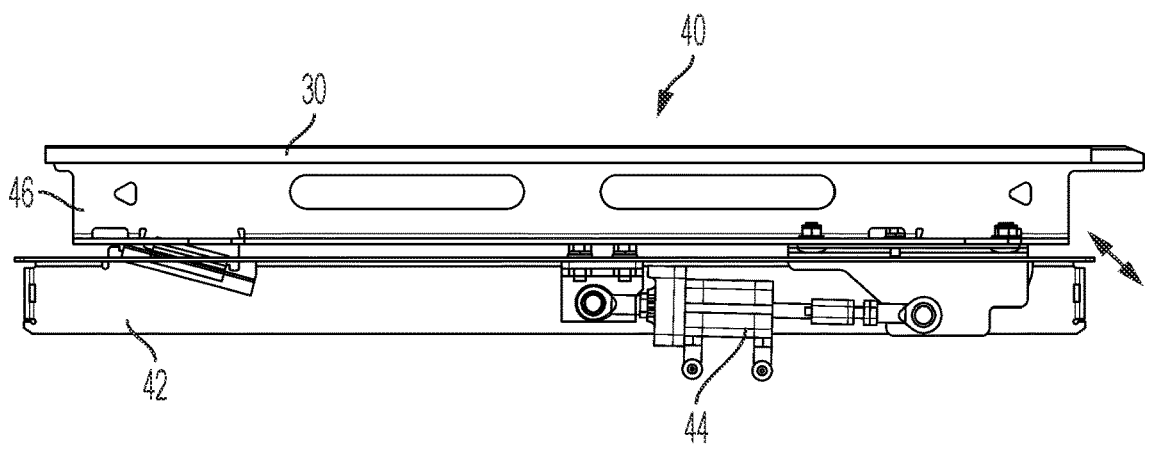
FIG. 5 is a side view of a wearstrip module of the activation assembly of FIG. 1.
Figure 6:
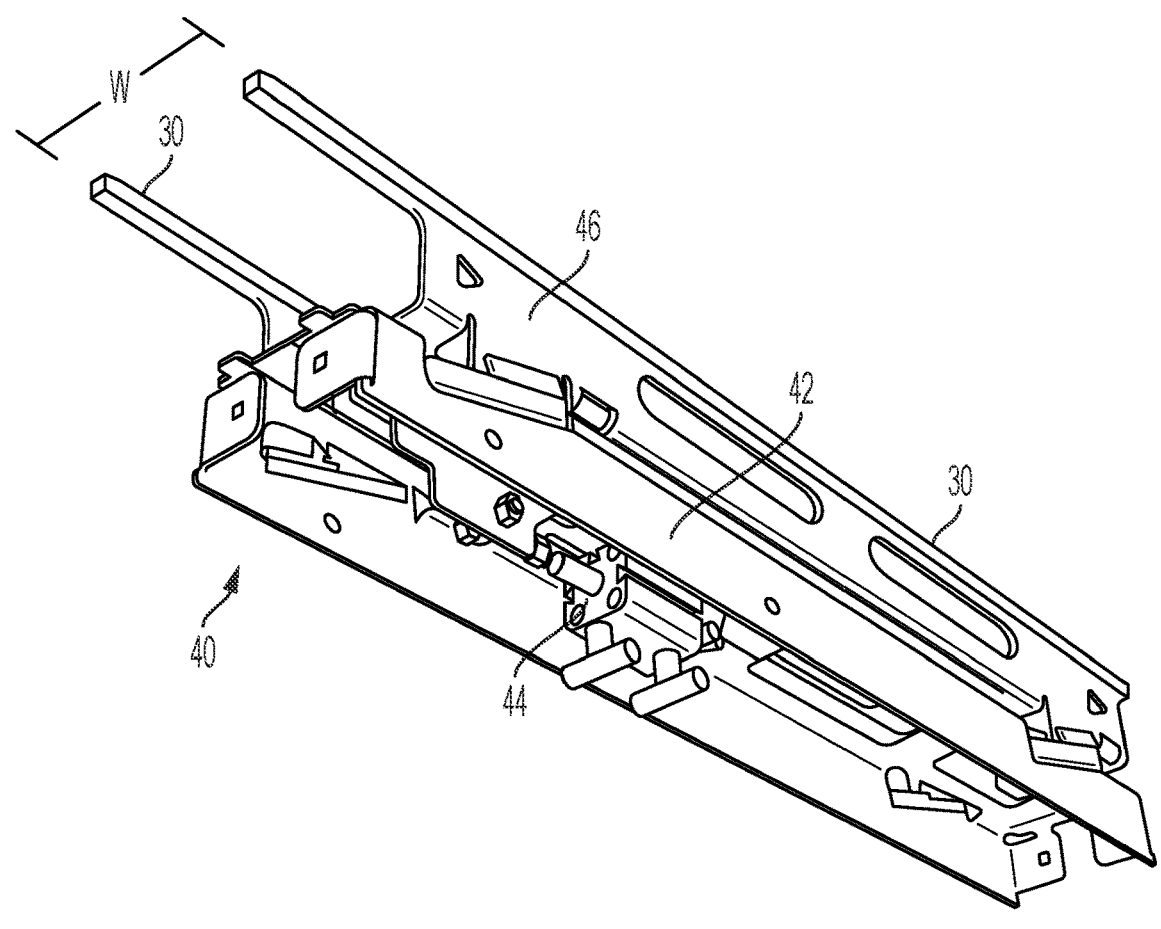
FIG. 6 is a bottom isometric view of the wearstrip module of FIG. 5.

Referring to FIGS. 5 and 6, each wearstrip module 40 for selectively guiding the conveyor belt comprises a lower frame 42 housing an actuator 44 and an upper frame 46 containing a pair of longitudinally-extending wearstrips 30. The wearstrips 30 extend along each upper side edge of the wearstrip module 40, separated by the width W of the module 40. The upper frame 46 is movably mounted on the lower frame 42, capable of translating longitudinally and vertically relative to the lower frame 42.

Figure 7:
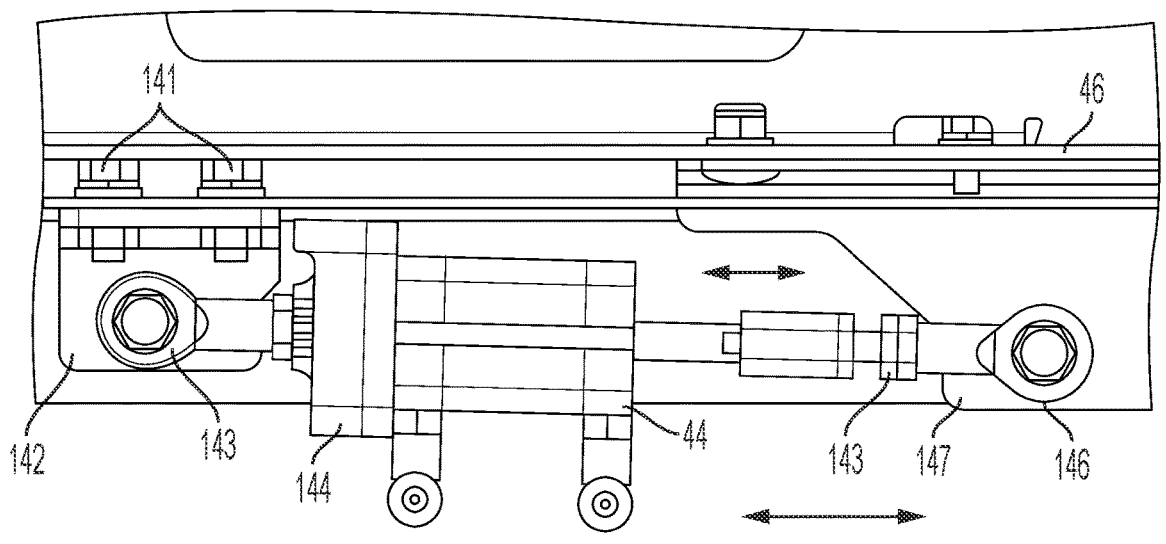
FIG. 7 is a detailed view of an actuator in the wearstrip module of FIG. 5.

As shown in FIG. 7, the actuator 44 is mounted between the side walls of the lower frame 42 using fasteners 141 connecting a top wall of the lower frame to a connecting plate 142. The connecting plate 142 couples to a clevis 143 attached to an adapter block 144 for the actuator 44. The reciprocating rod 143 of the actuator couples to a swivel eye rod 146 or other suitable connector to connect the actuator 44 to a connecting plate 147 that connects to the upper frame 46, and enables both vertical and longitudinal movement of the upper frame 46 relative to the lower frame 42 when the rod 143 extends and retracts. In FIG. 7, the actuator is in the extended position, which causes the wearstrips 30 to be lowered below the actuating rollers 28 and extended beyond the front of the activation assembly front bracket 22.

Figure 8:
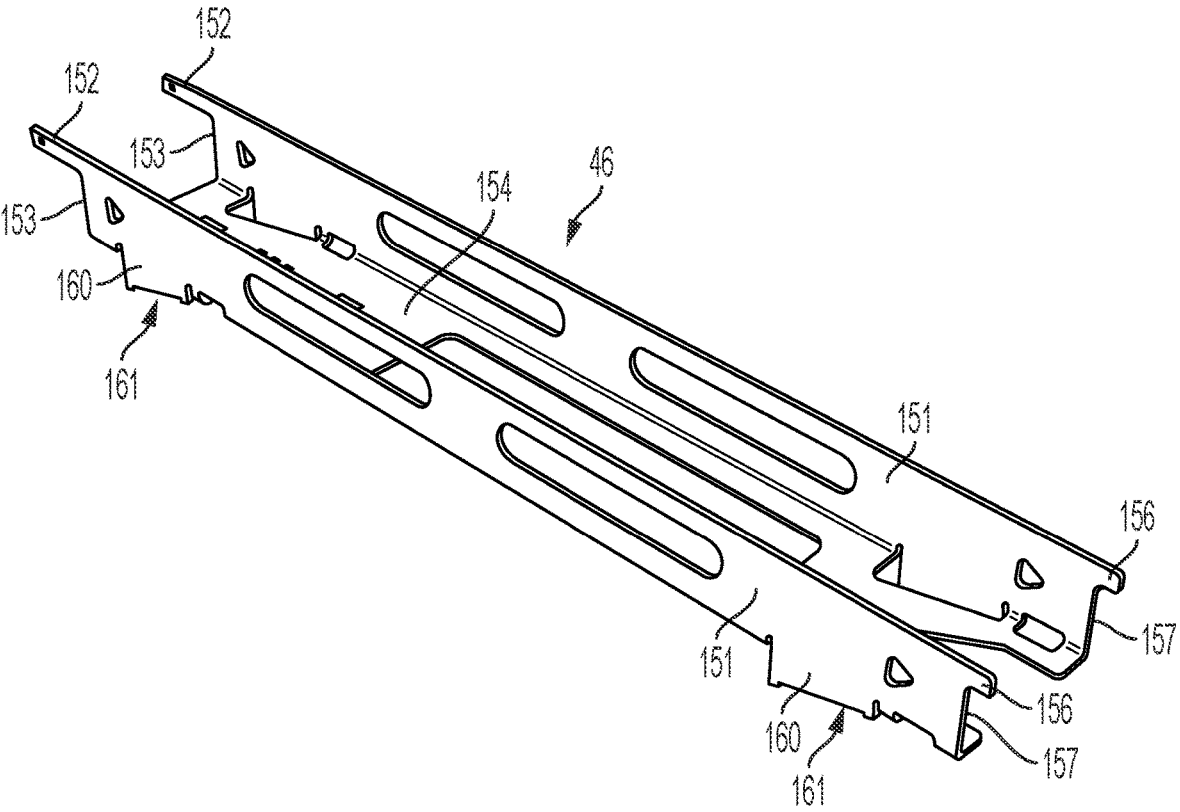
FIG. 8 is a top isometric view of the upper frame of the wearstrip module of FIG. 5.
Figure 9:
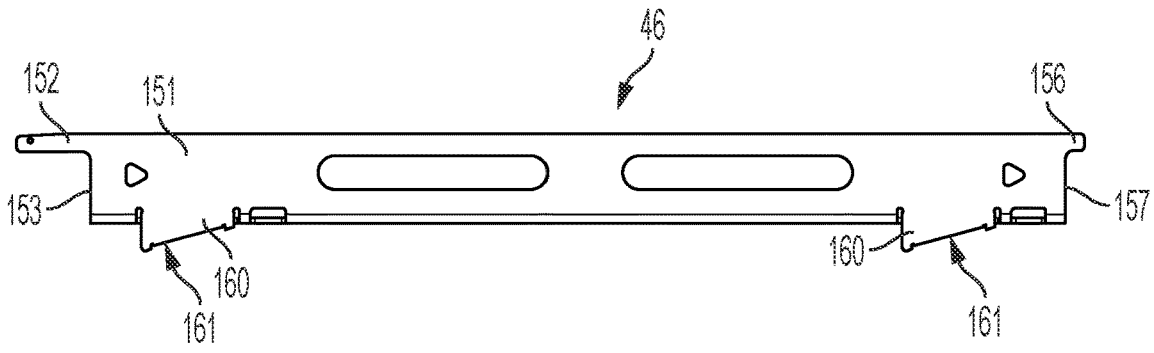
FIG. 9 is a side view of the upper frame of FIG. 8.

Referring to FIGS. 8 and 9, the illustrative upper frame 46 comprises a pair of spaced-apart, longitudinally extending side walls 151 for mounting the wearstrips, which may be press-fit on the top edges of the side walls 151 or otherwise mounted. At a first end, the side walls have protrusions 152 extending beyond front edges 153. Smaller protrusions 156 extend beyond the rear edges 157. A bottom wall 154 extends between and connects the side walls 151 from the front edges 153 to the rear edges 157. The bottom wall 154 includes openings for receiving the fasteners 141 for attaching the actuator 44 to the upper frame 46. Towards the front and rear edges, the side walls 151 include protrusions 160 in the bottom edges terminating in downwardly angled edges 161. The downwardly angled edges 161 extend below the bottom edges of the side walls 151.

Figure 10:
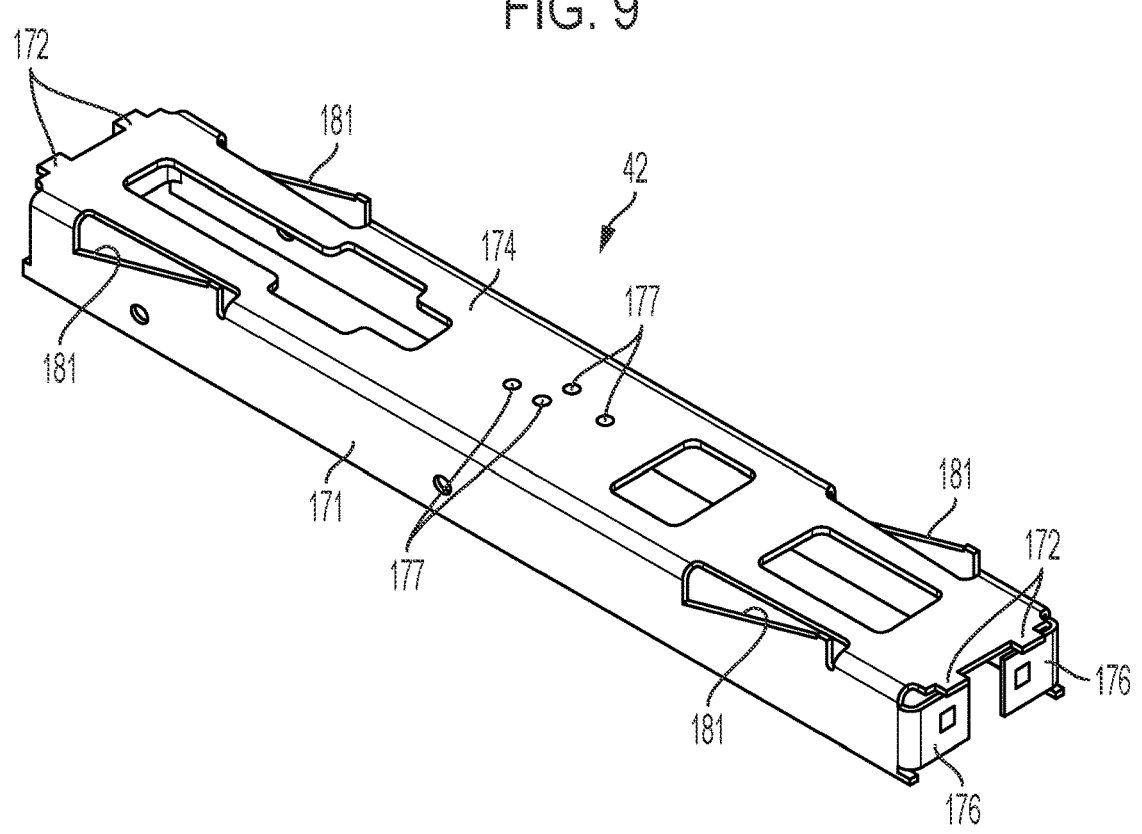
FIG. 10 is an isometric top view of the lower frame of the wearstrip module of FIG. 5.
Figure 11:
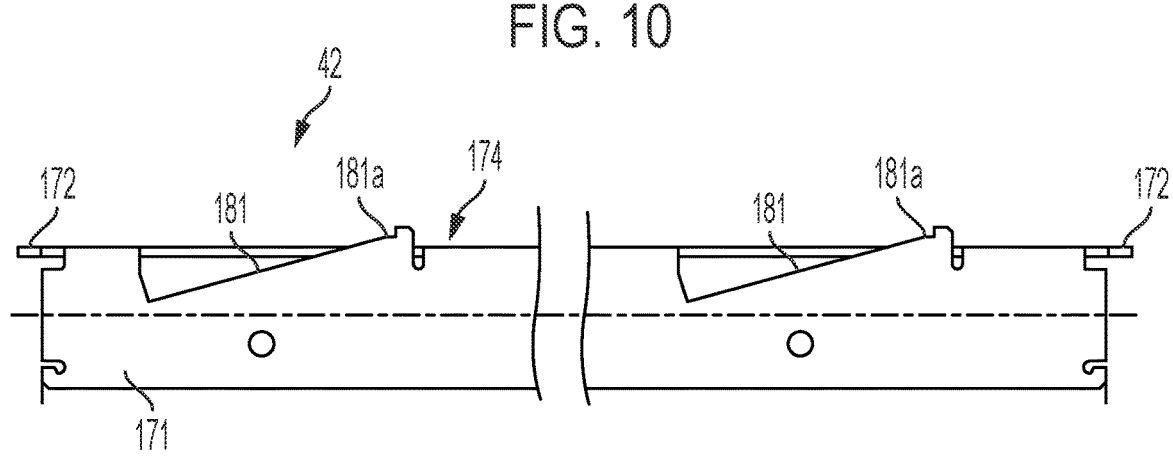
FIG. 11 is a side view of the lower frame of FIG. 10.

Referring to FIGS. 10 and 11, the lower frame 42 of the wearstrip module 40 comprises spaced-apart, longitudinally extending side walls 171 connected by a top wall 174. A pair of extensions 172 extends from the front and rear edges of the top wall 174. The extensions 172 are configured to be received in the slots 130 of a mounting bracket 22, 24 to mount the wearstrip module 40 to the mounting brackets 22, 24. Converging flanges 176 below the extensions 172 include openings for mounting the lower frame 42 to the mounting brackets 22, 24 via openings 129. Fastener openings 177 receive fasteners 141 for mounting the actuator 44 to the lower frame 42. The top wall 174 further includes cut-outs for accessing the actuator 44 and for allowing debris to fall through.

The lower frame 42 further includes ramps 181 at the upper edges of the side walls 171 near the front and rear ends of the lower frame. The ramps 181 are complementary to the angled edges 161 of the upper frame 46. In the illustrative embodiment, the top, rear end 181a of the ramps 181 protrude above the top wall 174.

Figure 12:
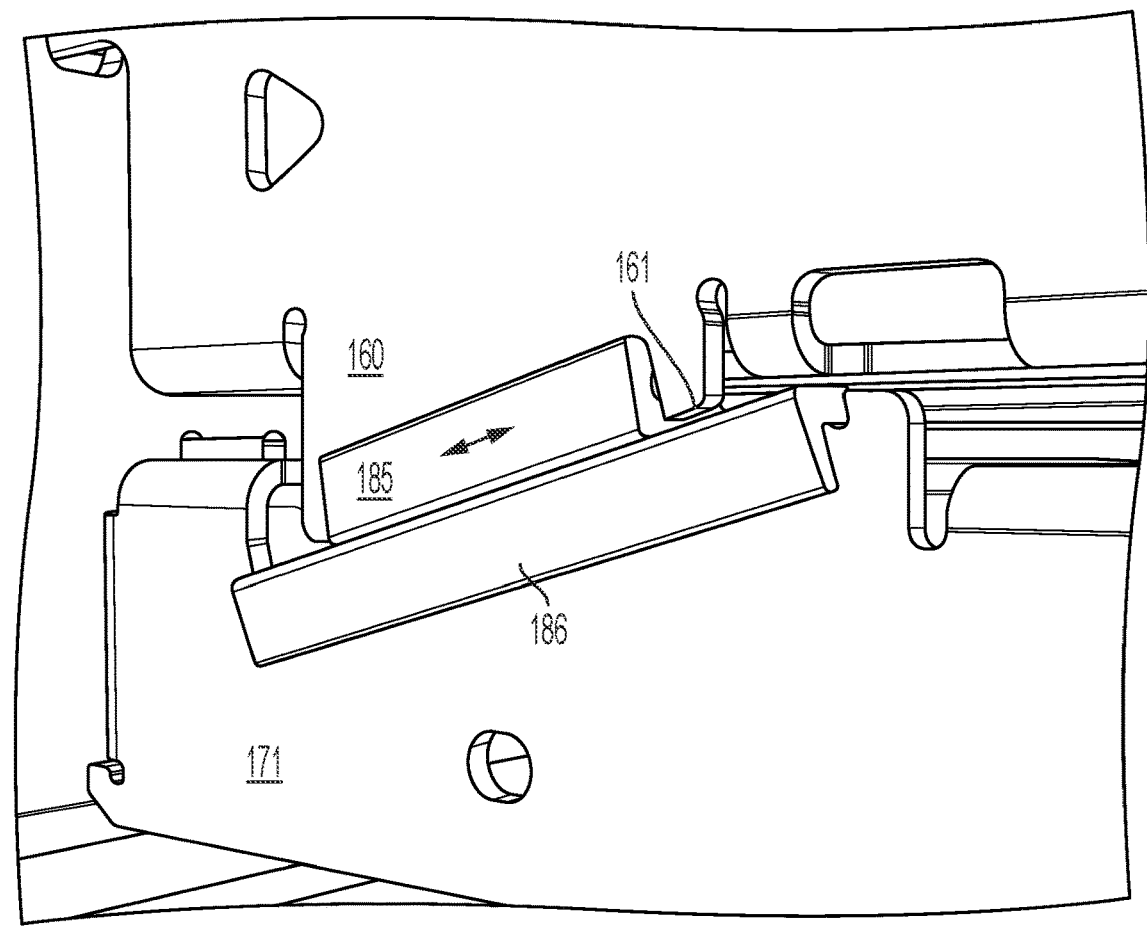
FIG. 12 is a detailed view of the slides at the interface between the upper frame and lower frame of the wearstrip module of FIG. 5.
Figure 13:
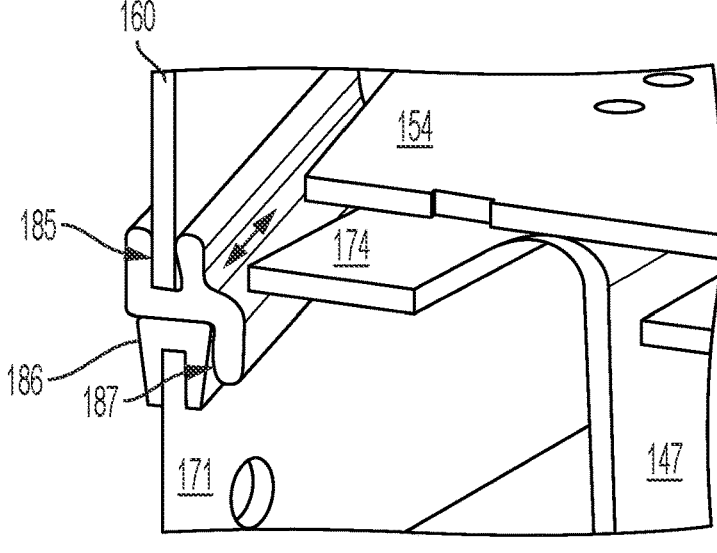
FIG. 13 is another view of the slides of FIG. 12.

Referring to FIGS. 12 and 13, the ramps 181 and angled edges 161 facilitate vertical and longitudinal movement of the upper frame 46 and wearstrips 30 relative to the lower frame 42, without moving the actuating rollers 28 out of position relative to the brackets 22, 24. Low-friction inserts, shown as upper slides 185 and lower slides 186 are attached to the angled edges 161 and ramps 181 such that the upper slides 185 rest on the lower slides 186. In the illustrative embodiment, the slides 185, 186 include flat outer surfaces that rest flat against each other. When the actuator 44 moves the upper frame 46 longitudinally, the interference between the slides 185, 186 translates into vertical and longitudinal movement of the upper frame 46 and wearstrips 30.

The illustrative upper frame slides 185 guide the upper frame 46 up and down and forward and back while resisting wear over time. The upper frame slides 185 have a longitudinal groove for receiving the angled edge 161 of the upper frame 46 and an inner lip 187 for preventing lateral movement of the components relative to each other. The lower slides 186 include a longitudinal groove for receiving the ramps 181. The illustrative slides are press-fit into place, but the invention is not so limited.

The wearstrip module 40 is not limited to the illustrative slides to effect vertical and longitudinal movement of the upper frame 46 and wearstrips 30 relative to the lower frame 42 due to motion of the actuator 44. For example, in another embodiment, the upper frame 46 can include rollers, such as bearings, on the bottom edges of the side walls 151 configured to roll over a ramp on the side edges of the lower frame to effect vertical and longitudinal movement of the upper frame 46 and wearstrips 30.

Figure 14:
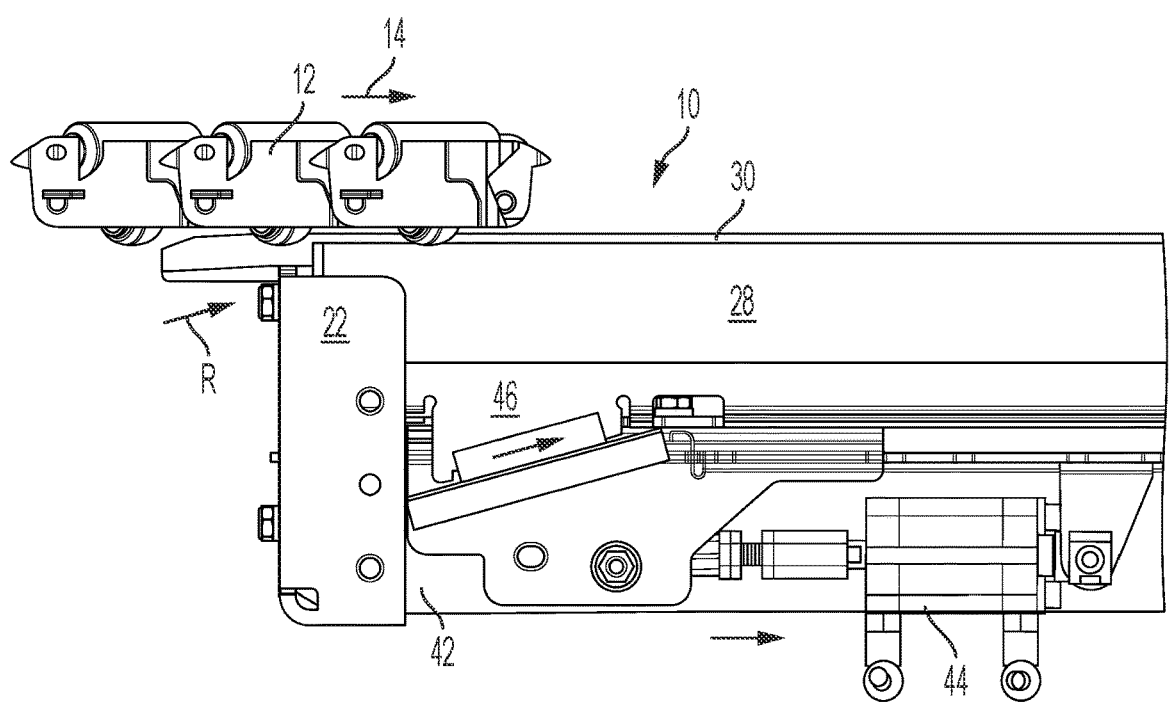
FIG. 14 is a side view of the infeed end of the activation assembly of FIG. 1 in a deactivated position, with the wearstrips raised and retracted.
Figure 15:
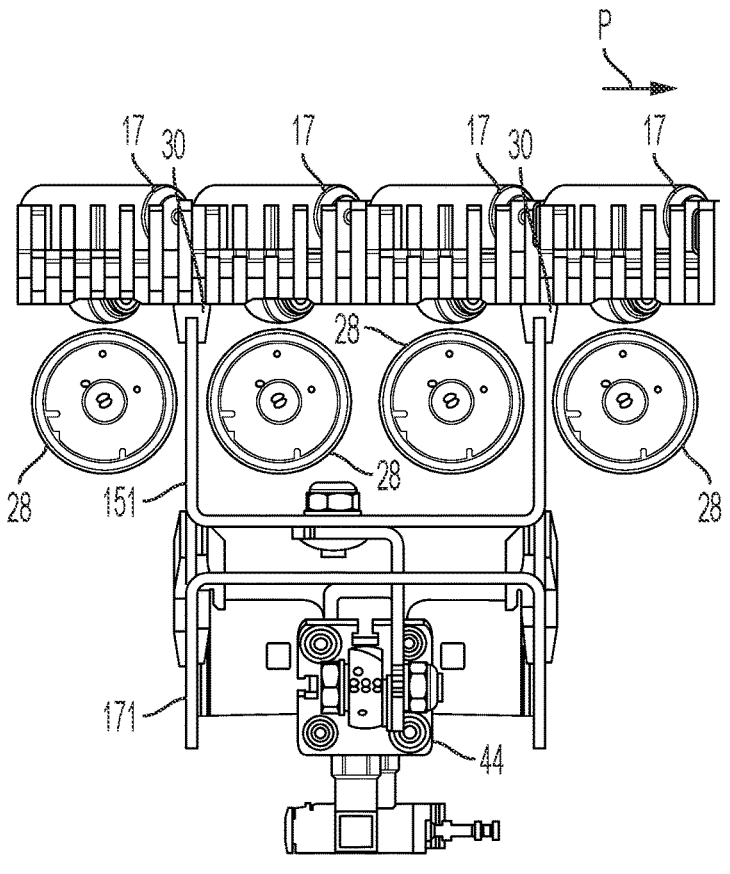
FIG. 15 is a front view of the activation assembly of FIG. 1 in the deactivated position.

FIGS. 14 and 15 show the infeed end of the activation assembly 10 when the actuator 44 is in the retracted, inactive position. In this position, the retracted rod of the actuator pulls the connected upper frame 46 longitudinally back, in the direction of belt travel. When pulled in this direction, the interference between the slides 185, 186 also pushes the upper frame 46 upwards to both raise and retract the wearstrips 30 in direction R. The raised and retracted wearstrips 30 contact the bottom surface of the conveyor belt 12, gently pulling the bottom rollers 18 above and out of contact with the activating rollers 28. In this position, the conveyor belt rollers 17, 18 are inactivated, and the product continues in the direction of belt travel 14.

Figure 16:
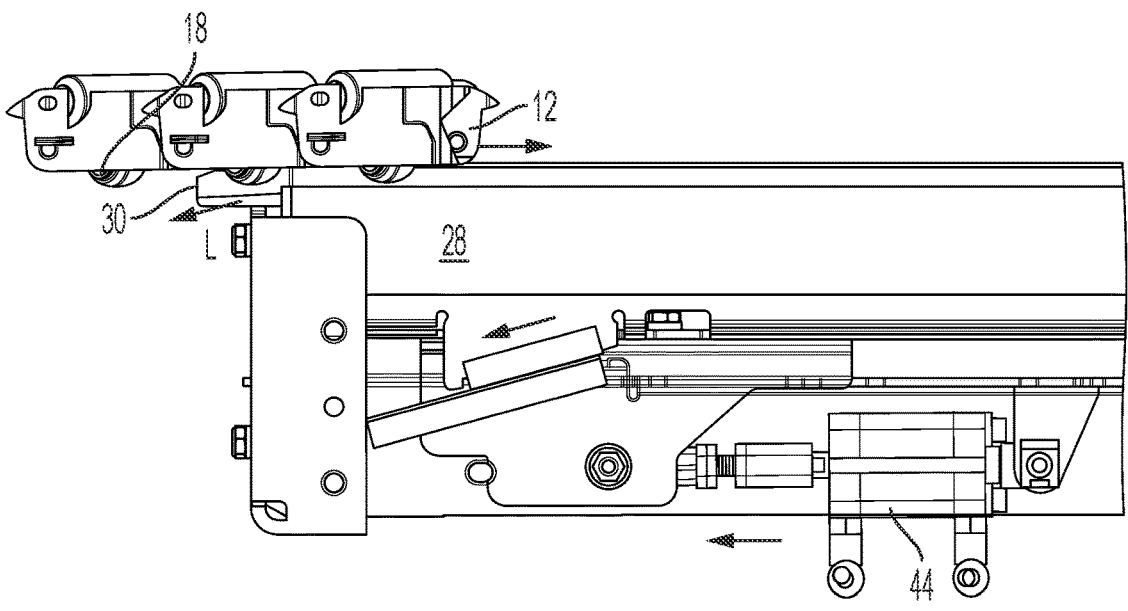
FIG. 16 is a side view of the infeed end of the activation assembly of FIG. 1 is an activated position, with the wearstrips lowered and extended.
Figure 17:
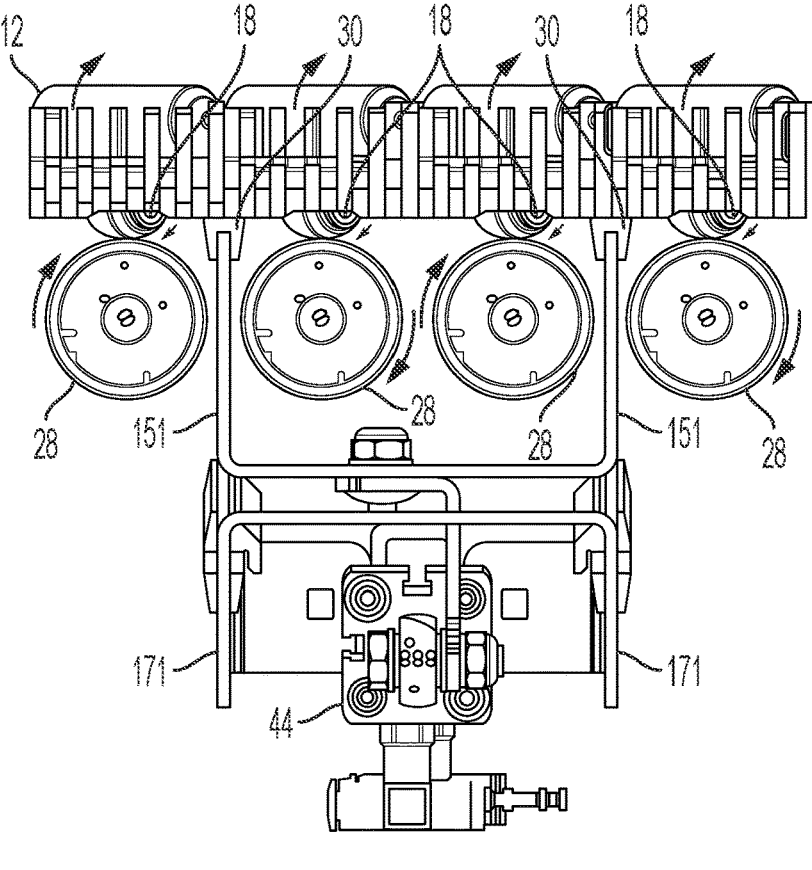
FIG. 17 is a front view of the activation assembly of FIG. 1 in the activated position.

To divert a product from the conveyor belt 12, the wearstrips 30 may be lowered and extended forward beyond the front of the activation assembly 10, to bring the lower conveyor belt rollers 18 into contact with the activation rollers 28, as shown in FIGS. 16 and 17. To lower and extend the wearstrips 30, the actuator 44 extends the rod 143, pushing the connected upper frame 46 forward. The interference between the slides 185, 186 also causes the upper frame 46 to lower vertically, so that the wearstrips 30 move in direction L. The lowering and extending of the wearstrips 30 gently lowers the conveyor belt 12, bringing the lower belt rollers 18 into contact with the activating rollers 28. As the conveyor belt 12 continues to move in the direction of belt travel 14, the contact between the lower belt rollers 18 and activating rollers 28 causes them to counter rotate relative to each other. In turn, the upper belt rollers 17 counter rotate relative to the lower belt rollers 18, causing product to be diverted off the conveyor belt 12 in direction P.

The movement of the wearstrips 30 in both the vertical and longitudinal direction facilitates the transfer of the contact points for the conveyor belt 12 between the wearstrips 30 and the activating rollers 28. In addition, the activating rollers 28 remain rigidly in place while free spinning, and do not need to be raised and-or lowered themselves, reducing noise and complexity. The illustrative activation assembly 10 reduces or prevents slip contact when moving the conveyor belt between the activated and inactivated positions.

Although the invention has been described with reference to a few preferred versions, other versions are possible. For example, the roller-actuating bearing surfaces used with belt rollers could be flat surfaces rather than actuating rollers or belt rollers arranged to rotate on axes oblique to the direction of belt travel. As another example, the belt rollers could be omnidirectional roller balls rolling on flat bearing surfaces rather than rollers rotating on thick axles. As these few examples suggest, the scope of the claims is not meant to be limited to the preferred versions described by way of example.

What is claimed is:

1. A conveyor comprising:
a conveyor belt advancing longitudinally in a direction of belt travel and having a plurality of article-supporting roller assemblies arranged in longitudinal columns and lateral rows, each roller assembly comprising an upper roller protruding above a top surface of the conveyor belt and a bottom roller for actuating the upper roller protruding below a bottom surface of the conveyor belt;
longitudinally-extending wearstrips laterally offset from the columns of article-supporting roller assemblies and extending in the direction of belt travel below the conveyor belt;
longitudinally-extending actuating rollers disposed at a fixed level below the conveyor belt and between the wearstrips and aligned with the columns of roller assemblies; and
means for moving the wearstrips vertically and longitudinally into and out of supporting contact with the conveyor belt to selectively raise the conveyor belt out of contact with the actuating rollers.

2. The conveyor of claim 1, wherein the wearstrips are mounted on a wearstrip module comprising an upper frame having side walls, wherein the wearstrips are mounted on upper edges of the side walls.

3. The conveyor of claim 2, wherein the wearstrip module further comprises a lower frame housing an actuator that moves the upper frame vertically and longitudinally relative to the lower frame.

4. The conveyor of claim 3, further comprising mounting brackets for mounting the longitudinally-extending actuating rollers, wherein the lower frame is fixed to the mounting brackets.

5. The conveyor of claim 4, wherein the upper frame includes protrusions in bottom edges of the side walls terminating in downwardly angled edges.

6. The conveyor of claim 5, wherein the downwardly angled edges extend below the bottom edges of the side walls.

7. The conveyor of claim 6, wherein the lower frame comprises side walls having ramps at upper edges that are complementary to the downwardly angled edges.

8. The conveyor of claim 7, further comprising a first set of low-friction inserts coupled to the downwardly angled edges and a second set of low-friction inserts coupled to the ramps, such that the first set of low-friction inserts slides over the second set of low-friction inserts.

9. The conveyor of claim 8, wherein the low-friction inserts in the first set include an inner lip to prevent lateral movement of the upper frame relative to the lower frame.

10. A wearstrip module for selectively raising and retracting a set of wearstrips, comprising:
a lower frame comprising a pair of lower side walls connected by a top wall, the lower side walls including ramps at upper edges;

an actuator housed between the lower side walls;
an upper frame comprising a pair of upper side walls connected by a bottom wall, the upper side walls including downwardly angled edges that protrude below the bottom wall, the upper frame connected to the actuator;
longitudinally extending wearstrips coupled to top edges of the upper side walls;
a first set of low-friction inserts coupled to the ramps; and
a second set of low-friction inserts coupled to the downwardly angled edges, wherein the second set of low-friction inserts rest on the first set of low-friction inserts, so that longitudinal movement of the upper frame relative to the lower frame effects vertical movement of the upper frame relative to the lower frame.

11. The wearstrip module of claim 10, wherein the ramps extend above the top wall of the lower frame.

12. The wearstrip module of claim 10, wherein the second set of low friction inserts include inner lips to prevent lateral movement of the upper frame relative to the lower frame.

13. The wearstrip module of claim 10, wherein the lower frame includes mounting means for mounting the wearstrip module to a mounting bracket.

14. The wearstrip module of claim 13, wherein the lower frame includes extensions configured to be received in slots in the mounting bracket.

15. The wearstrip module of claim 10, further comprising a connecting plate for connecting the actuator to the upper frame.

16. A method for operating an advancing conveyor belt having rows and columns of article-supporting roller assemblies extending through the thickness of the belt, the method comprising the steps of:
deactivating the article-supporting roller assemblies by raising wearstrips into contact with portions of the conveyor belt between the columns of article-supporting roller assemblies to pull and raise the conveyor belt out of contact with actuating rollers mounted between mounting brackets, wherein the step of deactivating the article-supporting roller assemblies comprises moving an upper frame supporting the wearstrips relative to a lower frame housing an actuator, the upper frame comprising a pair of upper side walls for supporting the wearstrips, a bottom wall connecting the upper side walls and downwardly angled edges that protrude below the bottom wall; and
activating the article-supporting roller assemblies by lowering the wearstrips relative to the mounting brackets, so that the article supporting roller assemblies contact the actuating rollers.

17. The method of claim 16, wherein the lower frame comprises a pair of lower side walls connected by a top wall, the lower side walls including ramps at upper edges configured to abut the downwardly angled edges of the upper frame.

18. The method of claim 17, wherein the lower frame comprises a first set of low-friction inserts coupled to the ramps and the downwardly angled edges include a second set of low-friction inserts that rest on the first set of low-friction inserts, so that longitudinal movement of the upper frame relative to the lower frame effects vertical movement of the upper frame relative to the lower frame.

* * * * *